(12) United States Patent
Chen et al.

(10) Patent No.: US 6,966,617 B2
(45) Date of Patent: Nov. 22, 2005

(54) ATTACHABLE FRAME FOR FLAT DISPLAY PANELS

(75) Inventors: Yu Chen, Taoyuan (TW); Ching-Hsiang Yu, Lujhou (TW); Ming-Yeang Lin, Taoyuan (TW)

(73) Assignee: Uniwill Computer Corp., Taoyuan Hsien (TW)

( * ) Notice: Subject to any disclaimer, the term of this patent is extended or adjusted under 35 U.S.C. 154(b) by 0 days.

(21) Appl. No.: 10/753,492

(22) Filed: Jan. 9, 2004

(65) Prior Publication Data

US 2005/0151451 A1 Jul. 14, 2005

(51) Int. Cl.⁷ .............................................. A47B 81/06
(52) U.S. Cl. ...................................... 312/7.2; 348/836
(58) Field of Search ............................. 312/7.2, 257.1, 312/263, 223.2; 345/905; D14/126; 361/681, 361/682, 683; 348/836, 839, 843; 248/918

(56) References Cited

U.S. PATENT DOCUMENTS

| | | | |
|---|---|---|---|
| 5,604,337 A | * | 2/1997 | Sugimoto et al. ............ 181/152 |
| 5,788,348 A | * | 8/1998 | Ramachandran et al. ......................... 312/223.1 |
| D439,225 S | * | 3/2001 | Kita ........................... D14/126 |
| 6,338,182 B1 | * | 1/2002 | Tseng et al. ................... 16/386 |
| 6,370,037 B1 | * | 4/2002 | Schoenfish .................. 361/807 |
| 6,480,243 B2 | * | 11/2002 | Yamamoto ................... 348/836 |
| 6,494,429 B2 | * | 12/2002 | Tajima ........................ 248/473 |
| D483,020 S | * | 12/2003 | Nagao et al. ............... D14/126 |
| D483,726 S | * | 12/2003 | Teng et al. ................. D14/126 |
| 6,688,576 B2 | * | 2/2004 | Oishi et al. ................. 248/317 |
| D490,063 S | * | 5/2004 | Miller ........................ D14/126 |
| 6,802,575 B1 | * | 10/2004 | Lee ............................. 312/7.2 |
| D499,387 S | * | 12/2004 | Liu et al. ................... D14/126 |

* cited by examiner

Primary Examiner—Janet M. Wilkens
(74) Attorney, Agent, or Firm—Rosenberg, Klein & Lee

(57) ABSTRACT

An attachable frame for flat display panels includes a flat display panel, a main structure, a bracing structure, a front frame and a rear frame. The main structure and the bracing structure provide bracing and steady support for the entire body. The front frame and the rear frame provide a desired appealing for the entire body. The main structure, bracing structure, front frame and rear frame are separable elements and are designed according to the dimension of the flat display panel. They may be assembled to form the exterior of the flat display panel, and become attachable to the flat display panel.

10 Claims, 7 Drawing Sheets

ATTACHABLE FRAME FOR FLAT DISPLAY PANELS

BACKGROUND OF THE INVENTION

Field of the Invention

The present invention relates to an attachable frame for flat display panels adopted for use on liquid crystal display (LCD) devices and plasma display devices that has separable elements to shorten test and repairs time and simplify the process.

With rapid progresses of modem time and rising of people's living standard, these days people have growing demands on life quality. This also reflects in electronic products. For instance, flat display device has become one of the most popular products on the market at present. Almost all major vendors have plunged into the flat display device market.

Conventional flat display devices generally have a front frame and a back cover that are fabricated in an integrated manner. The flat display panel is sandwiched therebetween. While the integrated front frame and back cover may be mass-produced at a lower cost, the current trend of flat display panel gradually focuses on larger sizes, and molding cost is expensive and time-consuming. In response to various dimensions and length and width ratios, different molds have to be prepared. With increasing number of flat display panel dimensions, the number of molds also increase. The cost burden becomes very heavy. In addition, change of production lines also involves change of molds to be used, and that takes time. As the molds usually are heavy and bulky, it takes a great deal of human efforts to do the work. Assembly and positioning also are difficult.

SUMMARY OF THE INVENTION

Therefore the primary object of the invention is to provide a frame which consists of a main structure, a bracing structure, a front frame and a rear frame that are separable. The main structure, bracing structure, front frame and rear frame may be adjusted according to the dimension and length and width ratio of the panel, and are assembled to become the frame of the flat display panel.

Another object of the invention is to provide a power supply connecting electrically to the flat display panel. The power supply may be located in a housing chamber formed in the speakers mounted on two sides of the flat display panel and be covered by a covering sheet, or be housed in a space formed between the rear frame and the flat display panel to be hidden to enhance the appealing of the entire body. The power supply may also be separated from the flat display device to suit different safety regulations of various countries to simplify product test process.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
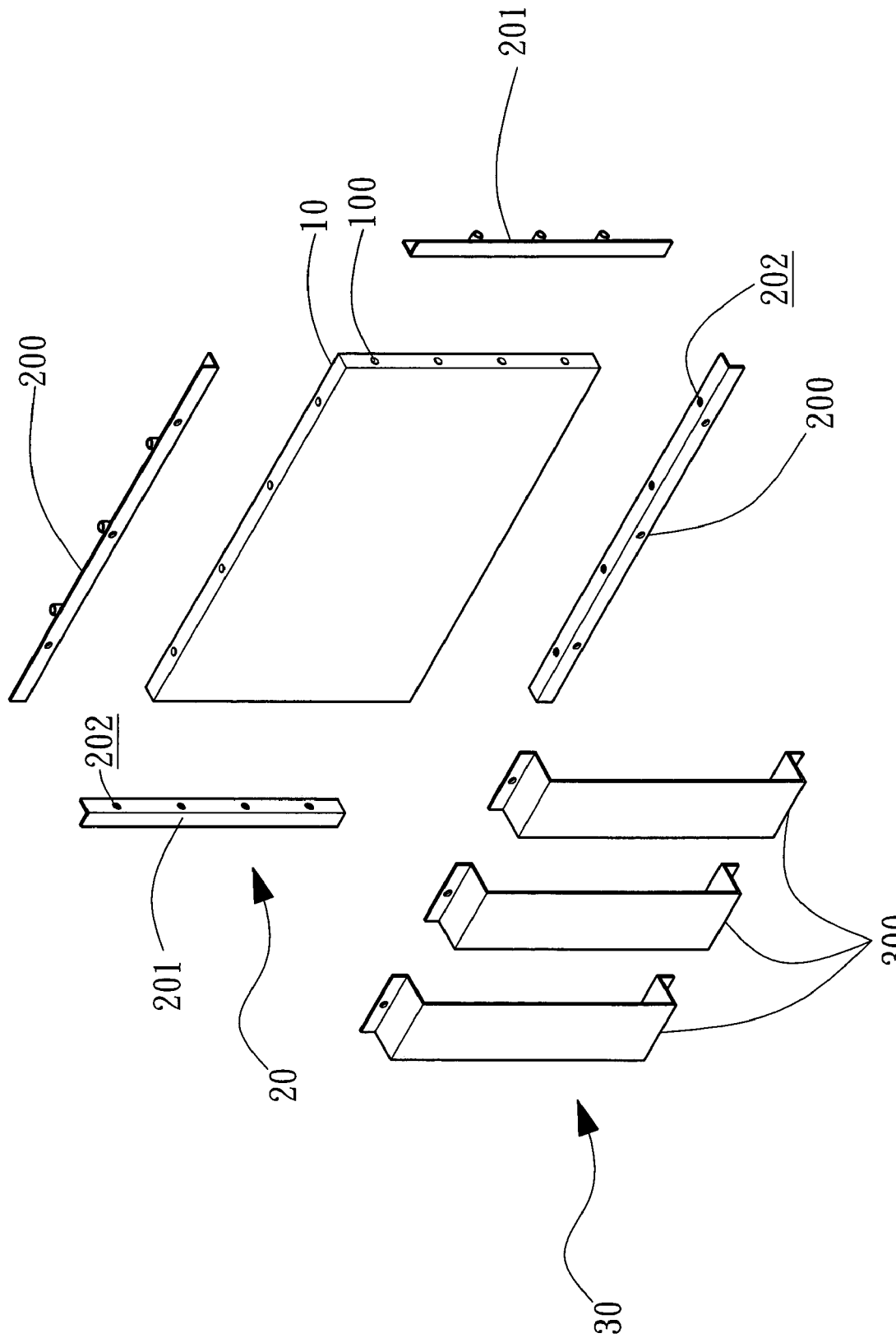
FIG. 1 is an exploded view of a flat display panel and the main structure according to the invention.

Refer to FIG. 1 for a flat display panel 10, a main structure 20 and a bracing structure 30 according to the invention. The main structure 20 consists of four inner frame members made of a same bar type member cutting at required lengths to match the dimension of the flat display panel 10. They are defined according to their lengths as two long side members 200 and two short side members 201. The bracing structure 30 consists of three bracing members 300. The flat display panel 10 has four sides which have a plurality of fastening holes 100 formed thereon to couple with a plurality of apertures 202 formed on the main structure 20 and are fastened by screws (not shown in the drawing) to achieve a desired strength and smoothness for the entire body. The bracing members 300 of the bracing structure 30 have two ends fastened to the two parallel long side members 200 of the main structure 20 to provide rigidity required to support the entire body when hung on a wall. The apertures 202 on the long side members 200 and the short members 201 may be dynamically adjusted according to the locations of the fastening holes 100 on the flat display panel 10. Moreover, the main structure 20 and the bracing structure 30 are made of metal to provide a better protection against electromagnetic interference (EMI).

Figure 2:
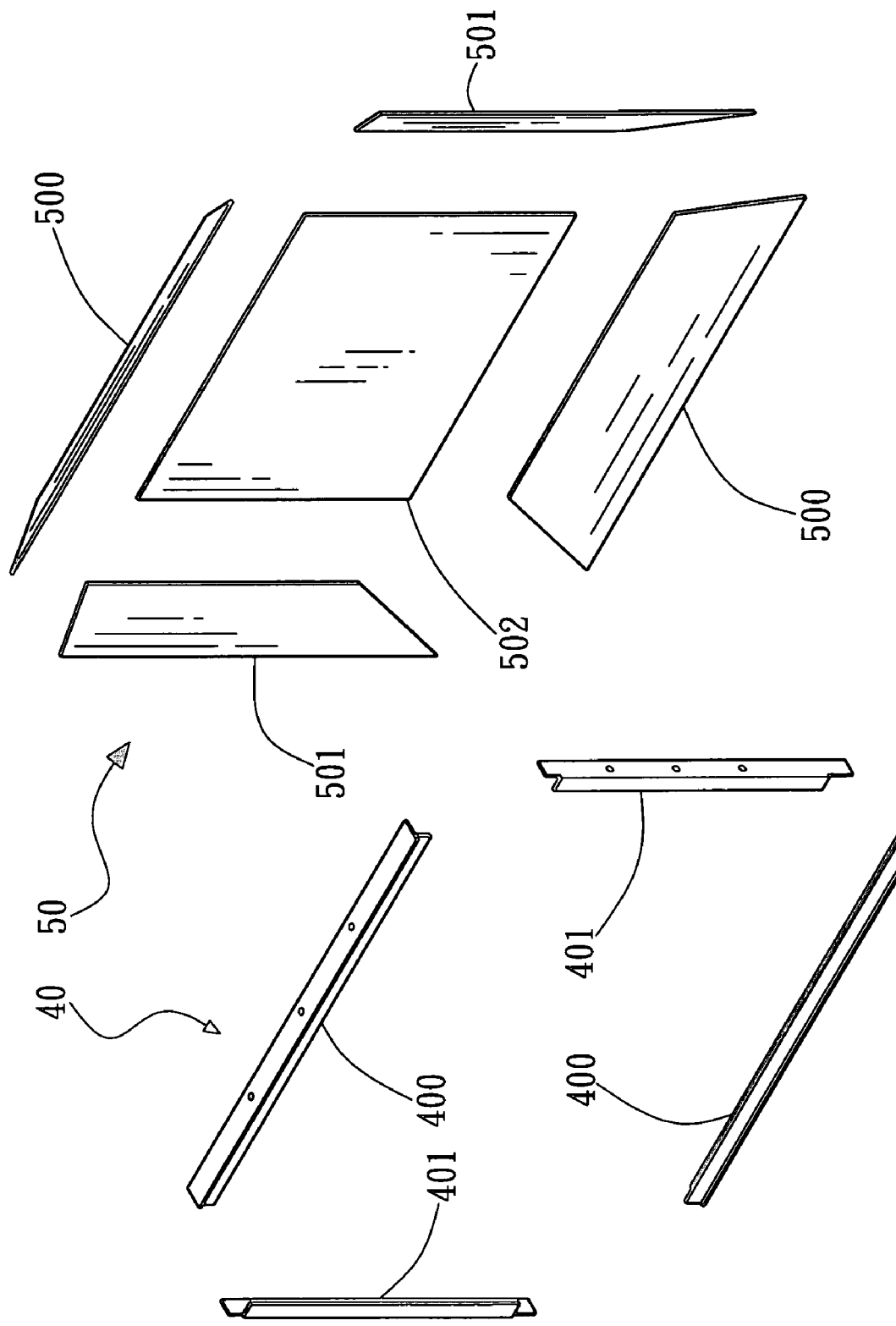
FIG. 2 is an exploded view of the exterior structure according to the invention.

Refer to FIG. 2 for a front frame 40 and a rear frame 50 of the invention. They consist of separable elements. The front frame 40 consists of four rails made of a same rail bar cutting at different lengths to match the dimension of the flat display panel 10. They are defined according to their lengths as two front long side rails 400 and two front short side rails 401. The rear frame 50 consists of four rear frame boards of desired dimensions and a back board 502 to match the dimension of the flat display panel 10. After being cut at desired lengths, they are defined as two rear long frame back boards 500 and two short rear frame back boards 501. They are made of aluminum by extrusion.

Figure 3A:
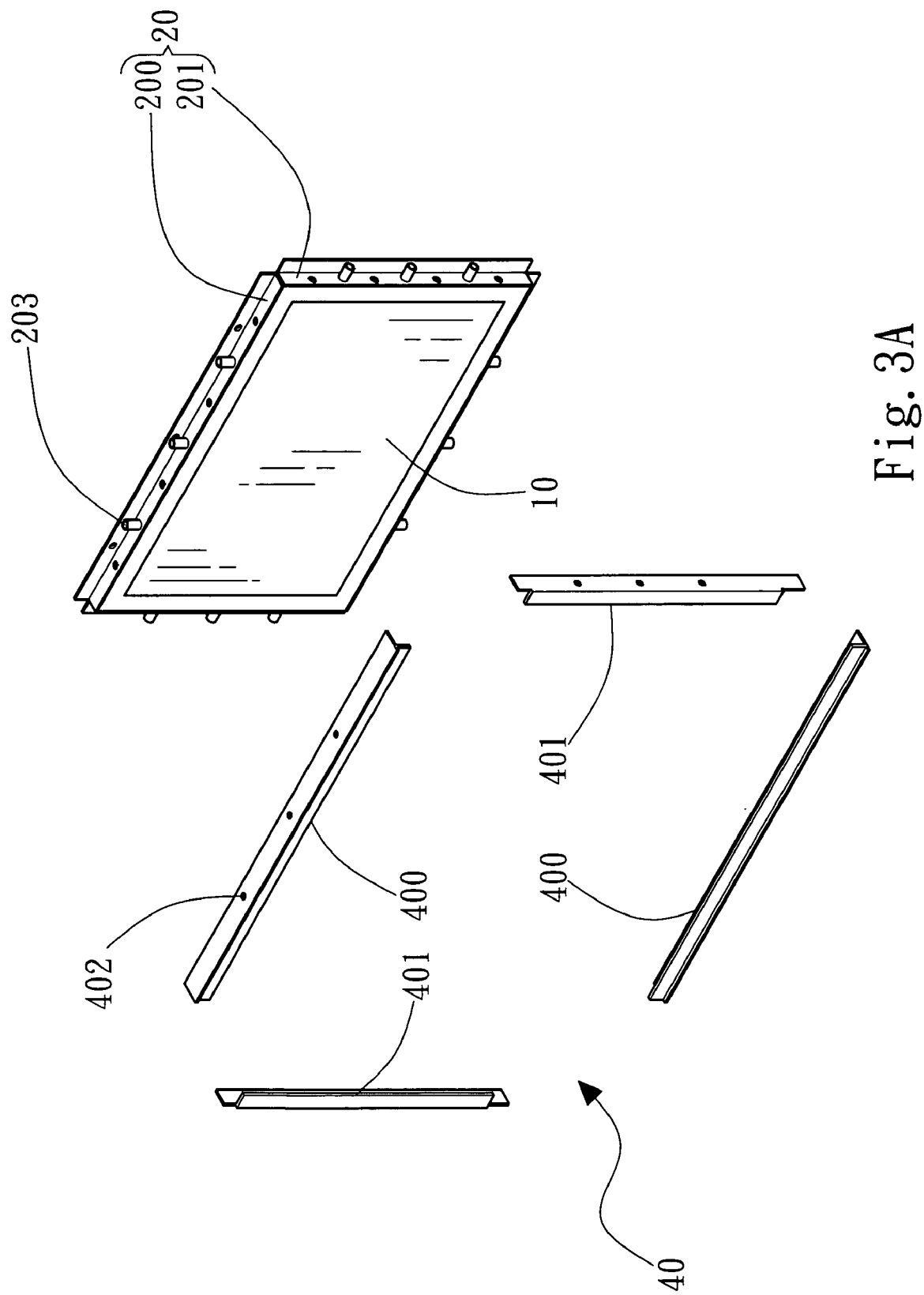
FIG. 3A is an exploded view of an assembled structure according to FIG. 1 and the front frame.
Figure 3B:
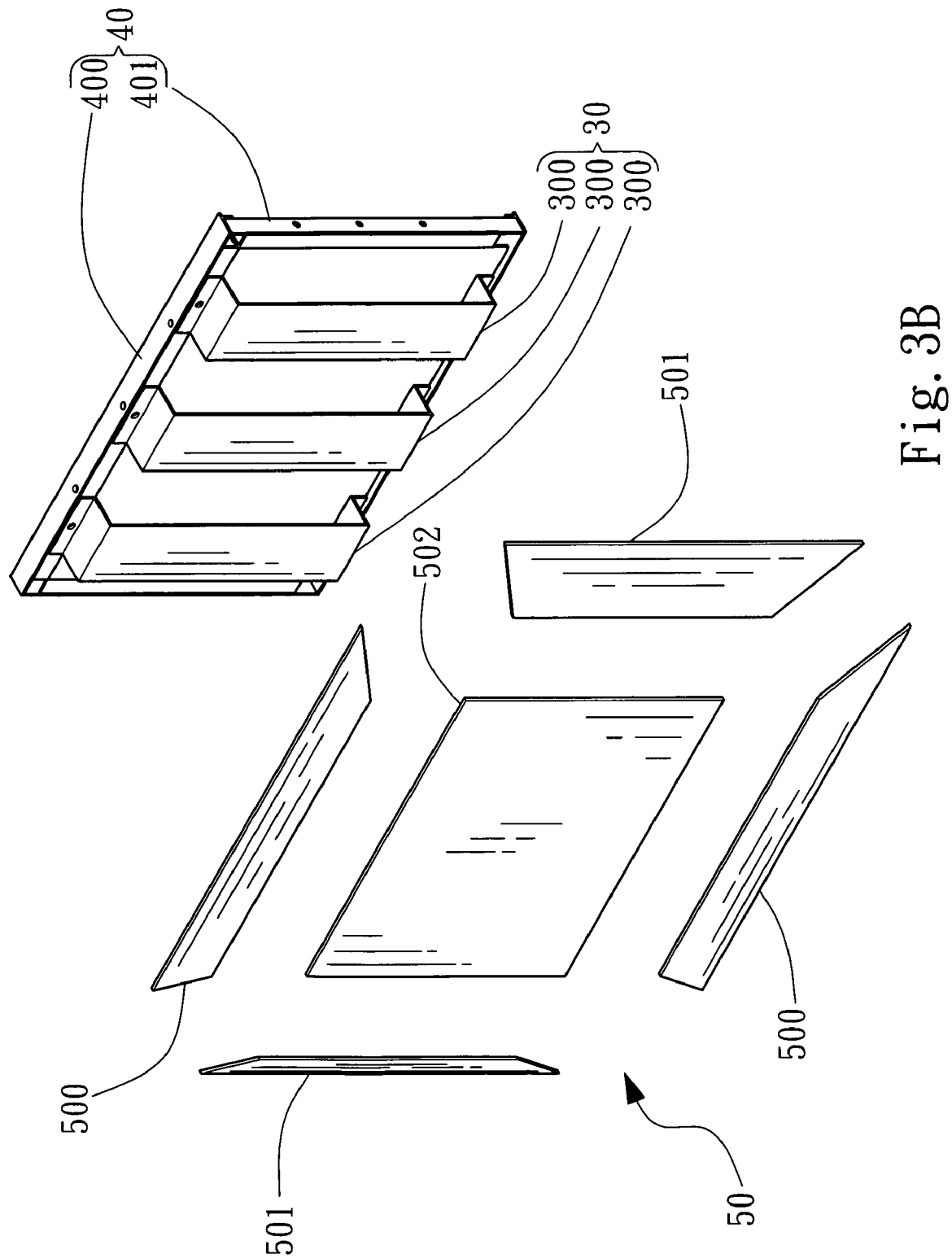
FIG. 3B is an exploded view of an assembled structure according to FIG. 3A and the rear frame.

Refer to FIGS. 3A and 3B for the exploded rear and front frames according to FIG. 1. The front frame 40 has two front long side rails 400 and two front short side rails 401 that have respectively a plurality of fastening holes 402 to couple with fastening members 203 located on the two long side members 200 and two short side members 201, and are fastened by screws (not shown in the drawings). The two rear long frame back boards 500 and two rear short frame back board 501 and the back board 502 are coupled respectively with the two long side members 200 and two short members 201 of the main structure 20 and the three bracing members 300 of the bracing structure 30 to form a frame to cover the flat display panel 10. The rear frame 50 and the flat display panel 10 may form a space therebetween to house required electronic elements (not shown in the drawings). As the front frame 40 and the rear frame 50 are assembled by separable elements, assembly is easy. It can be accomplished by only one person. And fastening may be done at precise locations. Only a few elements required to be removed for disassembly to do repairs and maintenance.

Figure 4A:
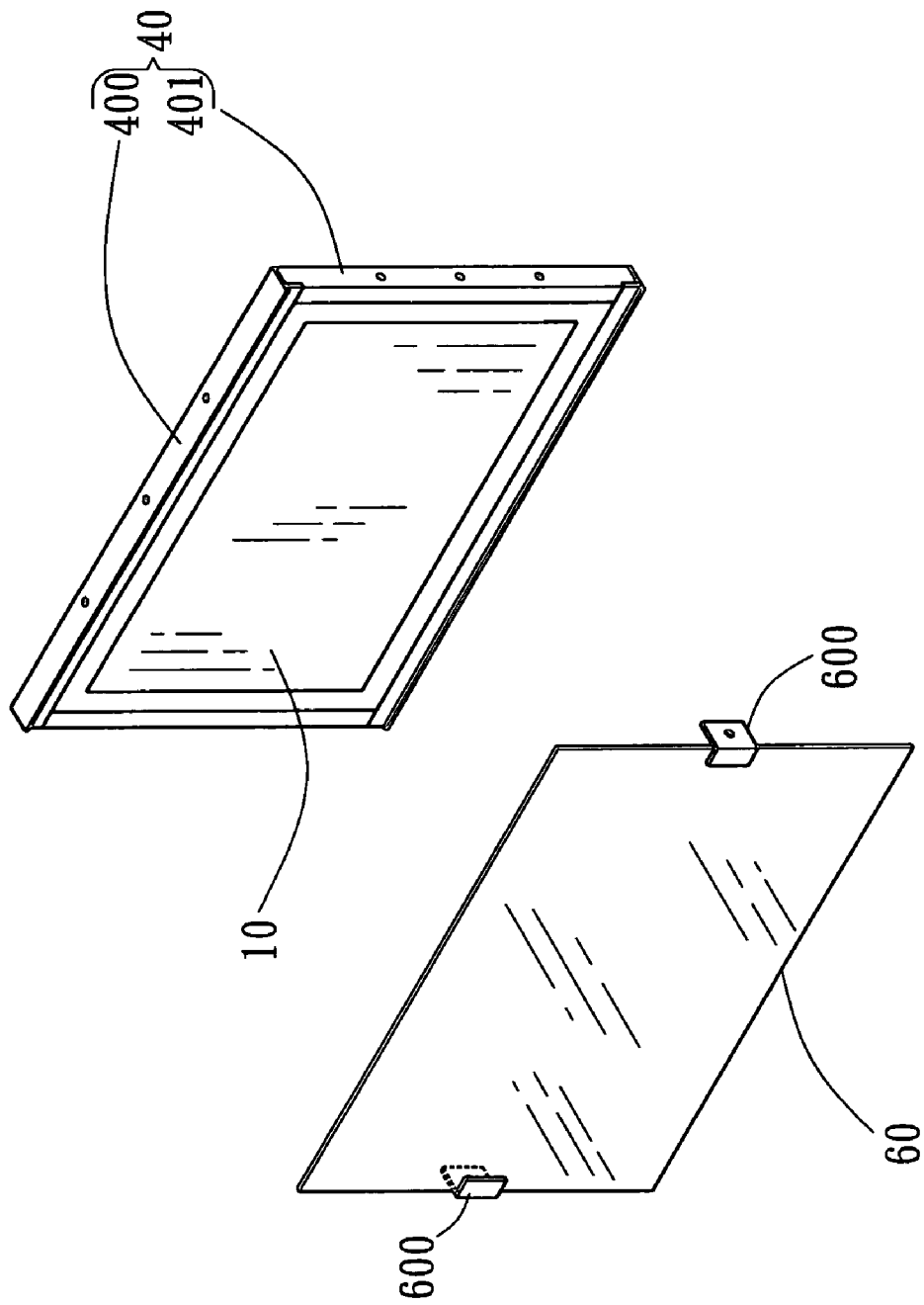
FIG. 4A is a schematic view of the invention coupled with a reinforced glass.
Figure 4C:
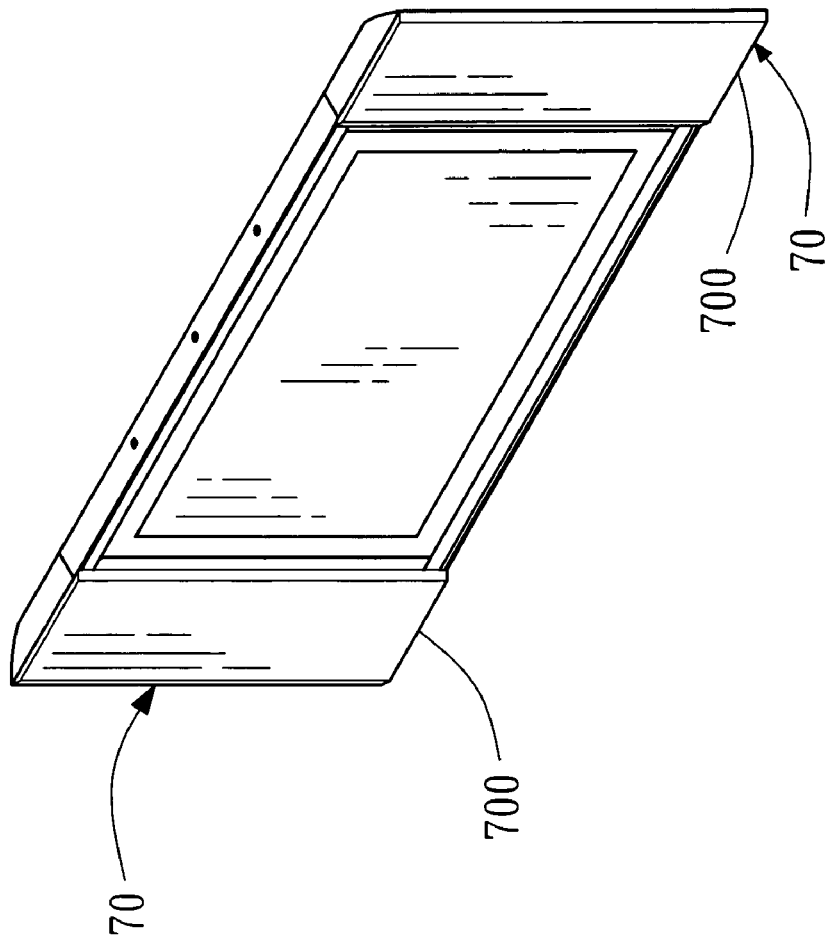
FIG. 4C is a schematic view assembled according to FIG. 4A coupling with two speakers.
Figure 4B:
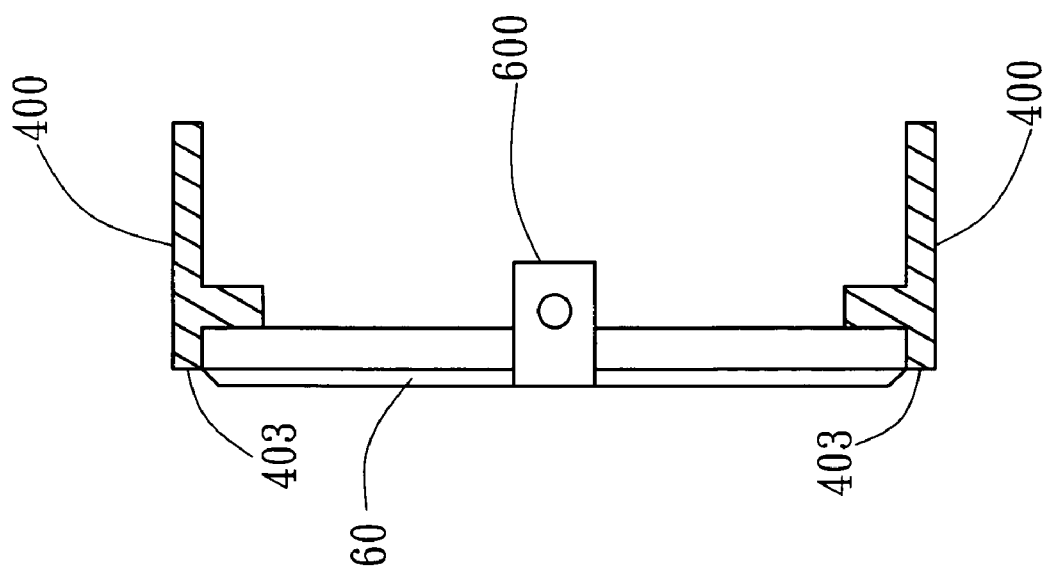
FIG. 4B is a side view of the invention showing the front long side rails of the front frame coupled with a reinforced glass.

Refer to FIG. 4A for the assembled structure to be coupled with a reinforced glass. The front end of the flat display panel 10 may be coupled with a rectangular and thin reinforced glass 60 to prevent external objects from hitting and damaging the flat display panel 10. The reinforced glass 60 has two coupling ledges 600 on the left and right sides. The reinforced glass 60 may be wedged between two flanges 403 formed on the two front long side rails 400 (referring to FIG. 4B). The two coupling ledges 600 may be fastened to the two front short side rails 401. Two speakers 70 (referring to FIG. 4C) may be disposed beside the two front short side rails 401 of the front frame 40. The speaker 70 is covered by a covering mesh 700 which is slightly larger than the front side of the speaker 70 and can cover a portion of the front frame 40. The exposed portion of the coupling ledges 600 on the reinforced glass 60 may also be covered by the covering mesh 700 so that the coupling ledges 600 are masked to make the appearance of the entire body neat and tidy.

Figure 5A:
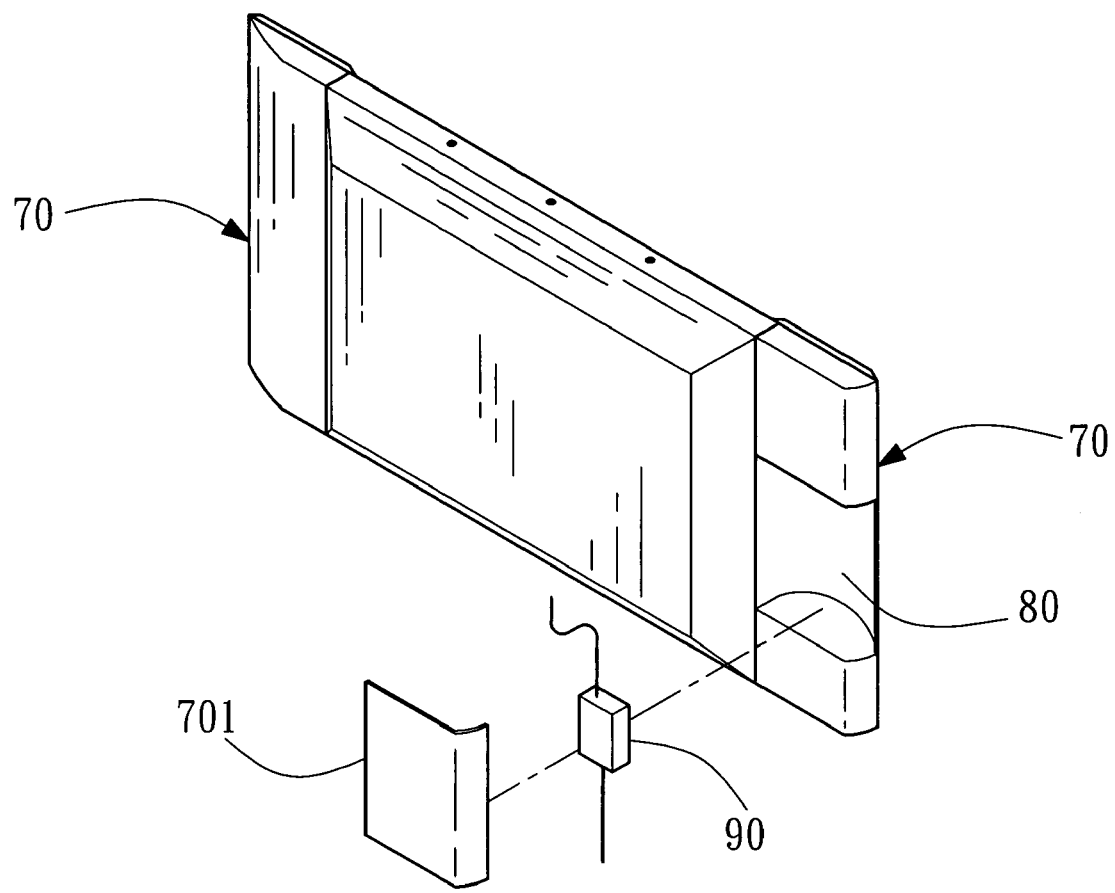
FIG. 5A is a schematic view of the invention coupled with a power supply and speakers.
Figure 5B:
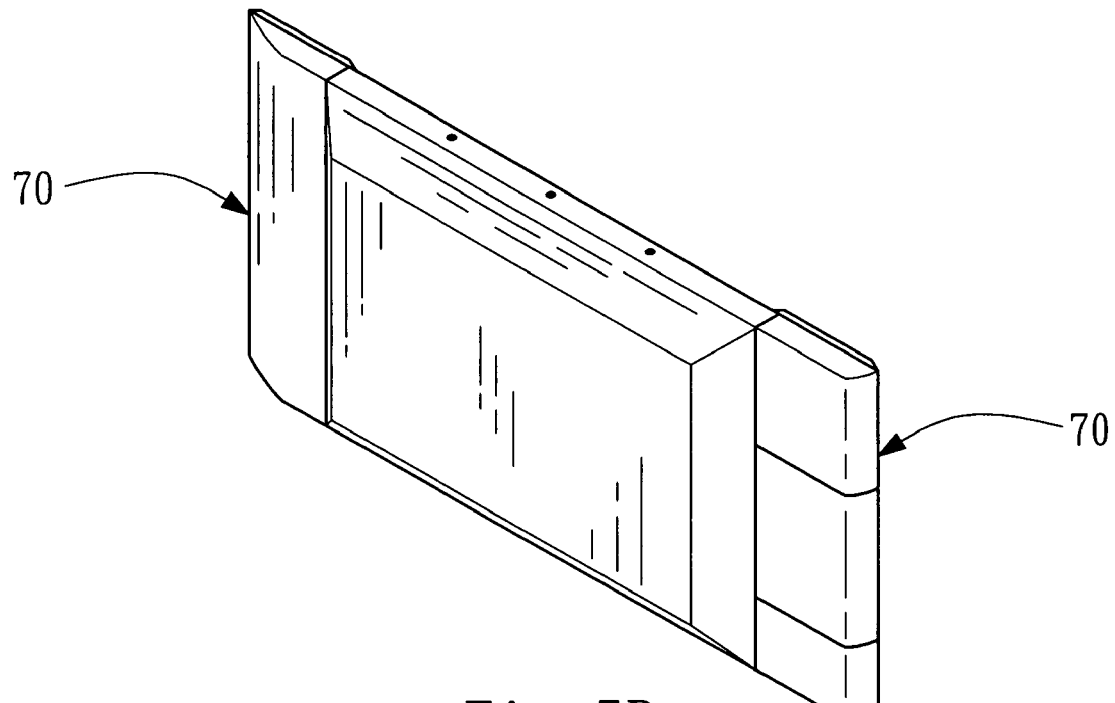
FIG. 5B is a schematic view of the invention assembled according to FIG. 5A.

Refer to FIG. 5A for the invention coupled with a power supply and speakers. The speaker 70 has a housing chamber 80 to hold a separable power supply 90. The power supply 90 provides electric power for the entire body. The housing chamber 80 is covered by a covering sheet 701 to keep the appearance of the entire body neat (also referring to FIG. 5B). The power supply 90 may also be held in the space formed between the rear frame 50 and the flat display panel 10 (not shown in the drawings).

In summary, the invention provides the following features:

1. The main structure and the bracing structure of the invention are made of metal, thus can provide a better protection for EMI. Moreover, the main structure is separable, and may be adjusted according to fastening means of the flat display panel. The main structure also has smooth appearance and provides required rigid strength for the entire body.
2. The front frame and the rear frame are separable, and may be adjusted according to the dimension and length and width ratio of the flat display panel. In the event that the dimensional variations occur to the flat display panel, the length of the frames may be cut as desired from the extruded aluminum bar. There is no need for making additional molds. Hence molding cost may be saved. In addition, the exterior structure is coupled with the main structure. Thus the assembly has the strength required.
3. The power supply is coupled externally. It is adaptable to various safety regulations of different countries, thus can simplify product test process and achieve required product reliability. Moreover, the power supply may be held in a preset housing chamber and masked by a covering sheet. Package size may be reduced, and the appealing of the entire product may be enhanced.

In summary, the present invention provides an attachable frame for flat display panels that makes assembly of the display device easier, and is more convenient for repairs and maintenance. There is no need for additional molding costs. The power supply is separable and externally coupled, and may be replaced according to safety regulations of different countries. The power supply may also be held in a preset space, thus package size may be reduced. And the entire product is more appealing. It is a great improvement over the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An attachable frame for a flat display panel which has a plurality of fastening holes formed on four sides thereof, comprising:
   a main structure having at least four inner frame members each having a plurality of apertures and more than four fastening members;
   a bracing structure having at least one bracing member which has two ends respectively fastened to two of said inner frame members disposed in parallel relationship to provide bracing and support;
   a front frame having at least four front side rails and more than four fastening holes to match said fastening members of said main structure for fastening said front side rails to said main structure; and
   a rear frame having at least four rear frame boards and a back board being fastened to said main structure and said bracing structure thereby said main structure, said bracing structure, said front frame and said rear frame are attached to a flat display panel.

2. The attachable frame for a flat display panel of claim 1, wherein said four inner frame members of said main structure are made of a bar type member, said inner frame members being formed in selected lengths to define two long side members and two short side members corresponding to respective dimensions of the flat display panel.

3. The attachable frame for a flat display panel of claim 1, wherein said four front side rails of said front frame are defined by two front long side rails and two front short side rails having respective lengths corresponding to respective dimensions of the flat display panel, the two front long side rails respectively having a flange to form a wedging space therebetween when coupled.

4. The attachable frame for a flat display panel of claim 3, wherein a rectangular reinforced glass is disposed at a front end of the flat display panel, the reinforced glass having two coupling ledges located on two opposing sides thereof to be wedged in said wedging space of said two front long side rails and fastened to said two front short side rails.

5. The attachable frame for a flat display panel of claim 3, wherein said two front short side rails are coupled respectively with a speaker.

6. The attachable frame for a flat display panel of claim 5, wherein said speaker and said front frame are covered by a covering mesh at a front side thereof, said covering mesh being larger than said speaker.

7. The attachable frame for a flat display panel of claim 5 further having a housing chamber for housing a power supply for the flat display panel, said housing chamber being located in said speaker or between the flat display panel and said rear frame.

8. The attachable frame for a flat display panel of claim 1, wherein said four rear frame boards of said rear frame are defined by two rear long frame back boards and two rear short frame back boards having respective lengths corresponding to respective dimensions of the flat display panel.

9. The attachable frame for a flat display panel of claim 1, wherein said main structure is made of metal to provide electromagnetic interference protection.

10. The attachable frame for a flat display panel of claim 1, wherein said front frame and said rear frame are made of aluminum.

* * * * *